United States Patent Office 3,160,697
Patented Dec. 8, 1964

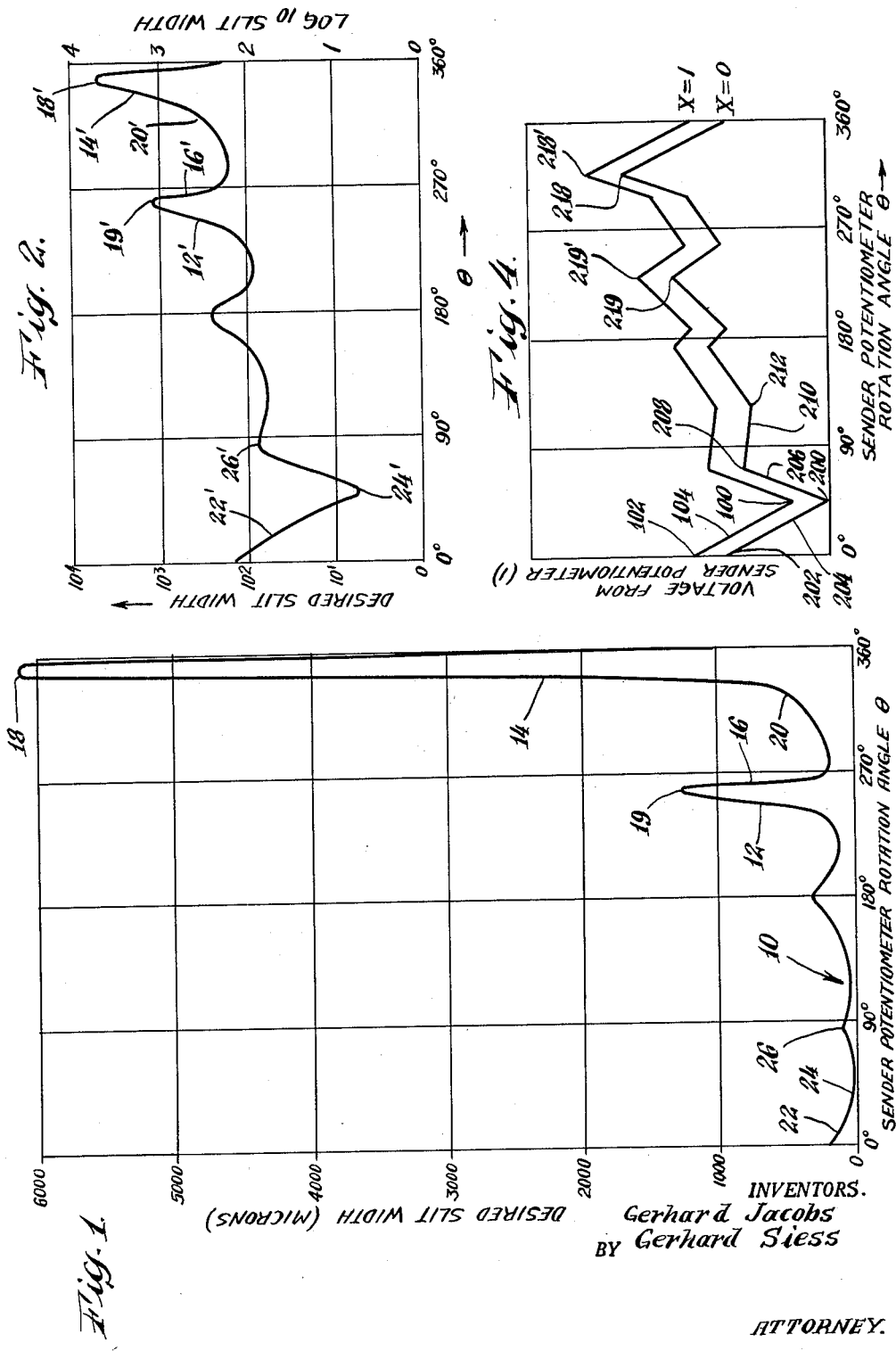

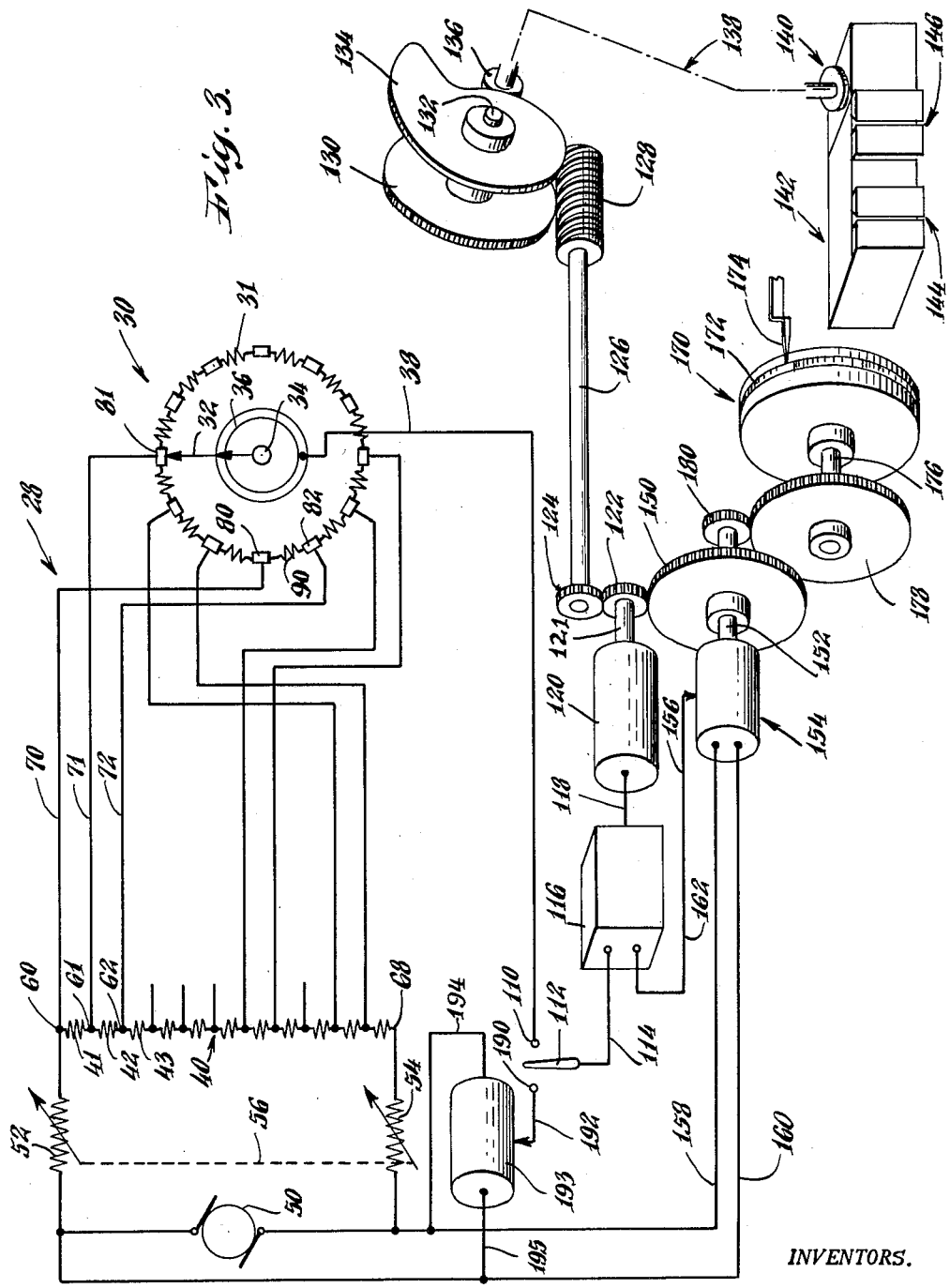

3,160,697
SLIT WIDTH ADJUSTMENT MEANS FOR OPTICAL INSTRUMENTS
Gerhard Jacobs, Friedhofstr. 37, Überlingen (Bodensee), Germany, and Gerhard Siess, Überlingerstrasse, Owingen, Kreis Überlingen, Germany
Filed Apr. 11, 1961, Ser. No. 102,148
Claims priority, application Germany Apr. 14, 1960
12 Claims. (Cl. 88—14)

This invention relates to a device for regulating the width of the adjustable slits in spectrophotometers. In such sepctrophotometers two beams of rays from a single source are utilized; one of said beams, the measuring beam, passes through the sample and the other beam, which is usually referred to as the comparison beam, bypasses the sample but is varied in intensity by an adjustable compensating means. These beams are usually alternately fed to the entrance slit of a monochromator, through the monochromator, and then out through its exit slit to a radiation detector. The radiation detector controls the adjustment of the compensating means in such manner as to cause the intensity of the two beams to become equal. The monochromator is adjusted (by means, for example, of the rotation of a Littrow mirror) so that the detector receives various wave lengths according to a predetermined program. By such rotation the entire part of the spectrum for which the sample is to be tested my be successively measured. This measurement is usually accomplished by use of a recording strip, which is driven at a rate commensurate with the monochromator Littrow mirror rotation, on which a recording stylus charts the position of the compensating means in the comparison beam. This will provide a graphical representation of how much attenuation of the comparison beam the compensating means must accomplish at each wave length in order to make the comparison beam equal in intensity to the measuring beam which has passed through the sample. Therefore, the amount of absorption of the sample versus wave length is automatically recorded.

Since spectrophotometers are balancing or null-measuring instruments, the absolute intensity of the original source of the two beams does not effect the final amplitude of the absorption curve determined, since the measurement is only of what percentage of artificial absorption must be produced by the compensating means in order to counteract the absorption of the sample at various wave lengths. Nevertheless, for various reasons the width of the entrance and exit slits of the monochromator is normally adjustable. The need for this adjustment is occasioned by two non-linear operating factors in the spectrophotometer. First, the source of radiation does not produce the same amount of energy at all wave lengths. Secondly, both the efficiency and the resolution of the dispersion means of the monochromator (whether it is a prism or a grating) are also variable according to wave length. Since the width of the monochromator entrance and exit slits affects both the total intensity of the light reaching the detector and the overall resolution of the entire optical system of the spectrophotometer, adjustment of these slits will compensate for both for the non-linearity of intensity caused by the non-linearity of the source and the dispersive means of the monochromator and for the non-linearity of the resolution of the monochromator. For the above reasons, it has been previously proposed to regulate the slit width as a function of the wave length in spectrophotometers. One technique of regulation utilizes a servomotor which is controlled by the difference between a voltage representative of the desired slit width and a voltage representing the existing slit width. The voltage representative of the desired slit width can be supplied by a sender potentiometer which generates a non-linear function according to desired slit program, the tap of said potentiometer being coupled with the wave length drive of the instrument (e.g., the cam which programs the rotation of the Littrow mirror).

Since it is frequently required that the slit width vary over a great range, the sender potentiometer in prior art systems must generate a voltage which also has an extremely large range of values. The greatest change in slit width is usually required at the upper extreme of the wave length of the part of the spectrum utilized. This is caused by the fact that both the intensity of the light source and the efficiency and dispersion characteristics of the monochromator dispersion means show the greatest change at the extreme limits of their usefulness. The invention provides a practical means for adjusting this slit width over a large dynamic range without requiring a sender potentiometer which has an inconveniently large range of values. Additionally, the invention accomplishes the adjustment of the slit over a large dynamic range with high precision, even if the width of the slits changes rapidly with wave length and the wave length range is being scanned relatively rapidly. Further, the precision is substantially constant over the entire wave length range.

In addition to the difficulty of obtaining a sender potentiometer having a steep enough voltage curve at the upper extreme of the desired wave length range, additional problems existed in the prior art designs. For example, the servomotor which operated the slits had to accelerate rapidly at the upper part of the wave length range, and this required a larger servomotor than would otherwise be adequate. In addition, even utilizing such an oversize servomotor did not completely eliminate the increased inertial effects at those points of the slit program where the motion of the slits was a maximum. Further, normal backlash or time lag in the apparatus at all point between the wave length drive and the slit adjustment means caused a maximum percentage or relative error in the slit width at small values thereof, since a small absolute error becomes an appreciable relative error when the slit width itself is small. Therefore, the relative or percentage error in the entire slit drive mechanism was not constant over the whole wave length range. As will hereinafter appear, the invention overcomes all these disadvantages of the prior art by the seemingly simple expedient of positioning a mechanical logarithmic coupling between the servomotor run by the sender potentiometer and the slit drive. By this means the range of voltage required to be generated by the sender potentiometer is markedly reduced, overloading of the servomotor is avoided, and the relative or percentage error caused by backlash and inertial effects in the entire system is markedly reduced and made constant over the entire wave length range utilized.

An object of the invention is therefore the provision of a slit program control which produces only a small and constant relative error in adjusting slit width over a large dynamic range and for the entire wave length interval desired.

Another object of the invention is the provision of a slit program which requires only a moderate range sender potentiometer and only a moderate size servomotor.

Another object of the invention is the provision of a slit program control means which minimizes detrimental backlash and inertial effects and allows rapid adjustment of the slit width over a large range of values while maintaining no more than a small relative error in the slit adjustment.

Another object of the invention is the provision of a simple means for changing the slit width by a constant factor without changing the relative width of the slit at different wave lengths.

Other objects and advantages of the invention will be obvious to one skilled in the art upon reading the following specification and upon studying the accompanying drawing in which:

FIG. 1 is a graphical representation of the desired slit width in microns versus the wave length program as represented by the angular position of the sender potentiometer tap which is linearly linked thereto;

FIG. 2 is a graph of the same slit width versus sender potentiometer rotation angle but in which the ordinate representing slit width is plotted as a logarithmic function;

FIG. 3 is a part-perspective, part-schematic illustration of the entire slit program control of the invention; and FIG. 4 is a graph of the actual voltage from the sender potentiometer versus the sender potentiometer tap rotation, also showing two different values which may be obtained by adjustment of resistances in the series with the sender potentiometer.

FIG. 1 shows graphically a typical desired slit width plotted against rotation of the sender potentiometer tap, said tap being linearly driven by the wave length drive (for example, the cam which rotates the Littrow mirror). This curve 10 has rapidly increasing slopes at such points as 12 and 14, as well as a rapidly decreasing slope at point 16, and an extremely high absolute value at points such as point 18 at the upper extreme of the wave length range utilized. In order to move the slits according to such a curve by a linear servomotor drive, the sender potentiometer must produce voltages which are substantially the same as the curve shown in FIG. 1. This obviously requires a sender potentiometer which can generate large differences in voltage as well as requiring a servomotor with sufficient torque to move the slit adjustment means rapidly along such steep parts of the curve as shown at 12, 14 and 16. In addition, since the sender potentiometer must necessarily deviate by some amount in voltage by some error and since any backlash in the drive from the Littrow mirror or similar wave length drive to the sender potentiometer or in the servomotor loop will cause a substantially constant linear voltage error, only a small winding or backlash error between points such as 24 and 26 will cause large percentage errors in the signal sent to the servomotor and therefore large percentage errors in the actual slit width. Similarly, potentiometer winding and backlash errors of the same absolute value will produce different relative or percentage errors in slit width at different points on the FIG. 1 curve.

The invention, by utilizing a logarithmic drive between the servomotor and the slit makes it possible for the theoretically desired voltage from the sender potentiometer to have values shown in FIG. 2. In this figure, since the ordinate is in logarithmic terms, the slopes at 12', 14' and 16' which correspond to the unprimed similarly referenced parts of the FIG. 1 curve are much more gentle and therefore more easily approximated by a sender potentiometer than the corresponding slopes in FIG. 1. Furthermore, the peak at 18' which corresponds to peak 18 in FIG. 1 is nowhere near as great in comparison to the rest of the curve as is the original FIG. 18; therefore, the range of the sender potentiometer may be considerably less than in FIG. 1. In addition, the true nature of the variation required at the small values of the slit width is more readily apparent in the left hand end of the curve in FIG. 2 (such as at points 22' and 24') than is true at the corresponding points 22 and 24 in FIG. 1. The reasons for this accentuating of the smaller values and diminishing of the changes in the larger values in the FIG. 2 curve is, of course, inherent in a logarithmic system, but the advantages obtained are not at all obvious. These advantages can be shown, however, by mathematical analysis of a log function as compared to the original function curve.

For the FIG. 1 curve, where a linear relation exists for the voltage from the sender potentiometer, the servomotor rotation, and the slit width:

$$S = K\phi \tag{1}$$

where:

$S$ = slit width,
$K$ = a constant, and
$\phi$ = the servomotor rotation angle.

Taking differentials of both sides:

$$ds = K d\phi \tag{2}$$

Dividing Equation 2 by Equation 1:

$$\frac{ds}{s} = \frac{K}{K\phi} d\phi \tag{3}$$

or $$\frac{ds}{s} = \frac{d\phi}{\phi} \tag{4}$$

Since the left-hand term of this last Equation 4 is the relative or percentage error in the slit width, it can be seen that for a constant error $(d\phi)$ in the servomotor position, caused by error in the voltage of the sender potentiometer and by backlash, the percentage error in the slit width varies reciprocally with the servomotor position. Thus, for small values of the servomotor rotation angle $\phi$ (corresponding to small slit widths, such as at point 24 in FIG. 1), the relative error in the slit width is much greater for this constant backlash and voltage error than at large servomotor (large slits) values.

For the curve of FIG. 2, however, where the sender potentiometer voltage (to which the servomotor naturally responds linearly) is equal to the logarithm of the desired slit width:

$$\log_{10} S = K' \phi' \tag{5}$$

where:

$K'$ = a constant, and
$\phi'$ = the servomotor rotation angle.

Differentiating:

$$\frac{ds}{s} = \frac{K'}{\log_{10} e} d\phi \tag{6}$$

Thus, for the FIG. 2 relationship, the relative error in slit width (left-hand term in Equation 6) is directly proportional to the voltage and backlash caused error in the servomotor angular position $(d\phi')$ at all times. Since this error $(d\phi')$ is substantially constant, the relative error in the slit width is also constant for all values thereof.

The fact that a logarithmic curve (such as in FIG. 2) will yield constant relative or percentage error can be further shown by a simple numerical example. Consider the two points 24', 26' in FIG. 2 and the corresponding points 24, 26 in FIG. 1. Each of points 24 and 24' represent a value of approximately eight micron slit width, and each of points 26 and 26' represent an eighty micron slit width. In FIG. 1, this ten-fold relative change appears as a very small voltage difference, while in FIG. 2, the true nature of this change of a whole magnitude is more readily apparent. Now let us consider points 19 and 18 in FIG. 1 and the corresponding points 19' and 18' in FIG. 2. For points 19 and 19' the value of the slit width desired is about 1250 microns, and for points 18 and 18' about 6200 microns. Thus, the slit width passes five times as much light at points 18 (or 18') than at point 19 (or 19'). This relative change is actually less than the ten-fold change between points 24 (and 24') and 26 (and 26'), and the FIG. 2 curve faithfully shows this by the fact that the difference in height between points 19' and 18' is less (in fact, one-half) the difference in height between points 24' and 26'. In contrast, the difference in height between points 19 and 18 is many times greater than the difference in height between points 24 and 26. Thus, if a potentiometer were to send a voltage proportional to the FIG. 1 ordinate, a slight error therein between points 24 and 26 would cause a great error in the proportional amount of light passed by the slits at this part of the slit program. For example, a 1% error of its total voltage (equal to 6200 units) would cause a 62 micron error in slit adjustment. At point 24 (representing 8 microns) this would be almost an 800% error in slit width while at point 18 (representing 6200 microns) this would only be a 1% error. On the other hand, a 1% error of a potentiometer which produces a voltage approximating the FIG. 2 curve would produce essentially the same relative error at point 24' as at point 18'.

Before describing the actual potentiometer voltages produced, as shown in FIG. 4, to approximate the theoretically desired slit width control voltages of FIG. 2, the apparatus utilized will first be described.

In FIG. 3 the entire apparatus for adjusting the slits is schematically shown. This apparatus comprises a sender potentiometer 28, composed of a rough linear potentiometer assembly 40 and a fine, circular interpolating potentiometer 30. The output tapping means 32 thereof is rigidly mounted on shaft 34, which shaft is rotated in direct proportion to the rotation of the wave length drive means (e.g., the cam which rotates the Littrow mirror). The tapping means 32 makes electrical contact between the various tapping points of a circular potentiometer element 31 of the interpolating potentiometer 30 and slip ring 36 thereby to provide to output wire 38 various voltage signals which effect the slit width adjustment. The sender potentiometer 28, in addition to the circular interpolating potentiometer 30, includes a resistive multi-tapped potentiometer assembly 40 (made up of resistor elements 41, 42, 43, etc.) which is energized from voltage source 50 through variable resistors 52 and 54. The various tap points such as 60, 61, 62, etc. are connected by lead wires 70, 71, 72, etc. to taps 80, 81 and 82, respectively, on the circular interpolating potentiometer element 31. Between the various taps on the circular interpolating potentiometer, resistances (such as resistance 90 between taps 80 and 82) are connected so that the tapping means 32 when moving between the various taps of circular interpolating potentiometer will pick-off voltages linearly changing from the value of one adjacent tap gradually to that of the next tap.

By this means the output of the entire potentiometer can be made to yield a voltage function such as the one shown in FIG. 4. For example, when the tapping means 32 moves clockwise from tap 82 to tap 80 across resistor 90, the part of the upper curve in FIG. 4 from point 102 to point 100 may be generated. In other words tap 82 would have the voltage value of point 102 in the FIG. 4 curve, and tap 80 would have the lower voltage value shown at point 100, so that movement of the tapping means 32 from tap 82 to tap 80 across resistance 90 would yield the decreasing straight line voltage of that part of the upper curve in FIG. 4 shown at 104. Similarly, the other taps of the circular interpolating potentiometer 30 would be connected to the various taps of the potentiometer 40 so as to yield the various points of inflection on the FIG. 4 curve; and the tapping means 32, in moving along the resistors between the various taps on the circular interpolating potentiometer element 31, would cause the straight line parts of the FIG. 4 voltage curve to occur on the slip ring 36 and therefore on the output wire 38.

The reason for including the variable resistors 52 and 54 in series with and, respectively, in front and behind the potentiometer 40 is to allow a certain amount of adjustment in the entire electrical system. For example, if variable resistor 52 is turned to its zero value, then tap 60 will have no potential as compared to upper side of voltage source 50 (which is assumed to be the ground side); however, should variable resistor 52 have a non-zero value, then tap 60 will have a non-zero voltage value.

In order to maintain a constant voltage across the linear potentiometer 40 (i.e., from point 60 to point 68), the variable resistors 52 and 54 have the same resistance range and are mechanically linked in such a manner that the value of their total resistance is a constant. Expressed algebraically the fact that the resistances 52 and 54 have a constant total resistance may be expressed as:

$$r_2 = R(x)$$

and $$r_4 = R(1-x)$$

where:

$r_2$ is the value (in ohms) of variable resistor 52;
$r_4$ is the value of the similar variable resistance 54;
R is the maximum value of the resistance of each of the variable resistances 52 and 54 (since each resistance is identical, both having the same maximum resistance); and
$x$ varies between the value of 0 and 1.

Since by maintaining the sum of the resistance values of variable resistances 52 and 54 constant will maintain a constant potential across points 60 and 68 of the linear potentiometer 40, the voltage difference between the various taps 60, 61, 62, etc. of this potentiometer remains constant and only a raising or lowering of the values of all of these taps simultaneously occurs with adjustment of the variable resistors 52 and 54. The mechanical means for maintaining the sum of the resistances 52 and 54 constant is diagrammatically illustrated by linkage 56 which connects the two identical resistances 52 and 54 so that adjustment of one in an increasing direction will decrease the resistance of the other in the same amount. The effect of the adjustment of the resistances 52 and 54 is shown in FIG. 4 by the two curves which may be generated by the positioning of the conjoint adjustment means 56 at each of its extreme positions. Thus the lower curve in FIG. 1 represents the adjustment of these resistances wherein resistance 52 is equal to zero (i.e., R times zero=zero), while the upper curve represents the condition where resistance 52 is at its maximum value, R (i.e., R times 1). By movement of the linkage connecting these two resistances, any values for the output of the potentiometer between these two curves may be generated at slip ring 36 over the 360° rotation of the tapping means 32. Resistances 52 and 54 therefore allow a family of voltage curves to be produced which have the same slope but have a slightly different voltage value linearly related throughout its extent to the two curves in FIG. 4. This adjustment allows a linear change to be made in the voltage output without affecting the shape of the curve; and this allows, as will be subsequently described, the adjustment of the slit over the same relative values but with an adjustment factor in case of the desire for different resolution or to compensate for such operational changes as weakening of the source or dirtying of the prism or grating or other optics in the spectrophotometer or in use of somewhat different replacement parts for any of these elements.

The various voltages developed at the output lead 38 of potentiometer 28 will appear at switch contact 110. When switch 112 is in the right-hand position, these voltages will be sent through wire 114 to amplifier 116, which will supply an augmented voltage through wire 118 to servomotor 120. This servomotor 120 will turn at a speed representative of the voltage being fed to it through wire 118 and will thereby drive gear 122 rigidly connected to the servomotor shaft 121. This gear 122 in turn drives gear 124 and, through shaft 126 and worm gear 128, gear 130 is thereby driven. Gear 130 is fastened to shaft 132 and upon this same shaft is fastened the logarithmic slit drive cam 134. This cam adjusts the slits through cam follower 136, mechanical linkage 138 and push rod 140. The slit mechanism diagrammatically shown at 142 may be any conventional slit means and is comprised of a pair of adjustable slit jaws 144 and 146.

In addition to driving gear 124, gear 122 also drives large gear 150 which is rigidly attached to shaft 152. Shaft 152 is connected to the adjustment means of linear balancing potentiometer 154 so that movement to the servomotor (and therefore the slit jaws) will also adjust the output voltage being tapped at 156 from this linear potentiometer 154. The potentiometer is energized by conventional means such as the same voltage source 50 over lead wires 158 and 160. The output voltage appearing at 156 is then fed through wire 162 into the amplifier 116. This voltage is then algebraically subtracted from the voltage fed from the function-generating sender potentiometer 28 (entering amplifier 116 through wire 114) so that the servomotor will cease to rotate when these two voltages are equal. By this means the servomotor is made to rotate the logarithmic slit drive cam 134 according to the output of the sender potentiometer, since any difference between the position of the servomotor as measured by the linear balancing potentiometer 154 and the position voltage sent by the sender potentiometer 28 will cause the servomotor to rotate until it reaches the correct position so that the linear potentiometer 154 produces an exact balancing voltage to that of the sender potentiometer. Of course, the actual process of balancing these voltages is continuous in that the tapping means 32 of the sender potentiometer is constantly moving and therefore supplying to amplifier 116 and servomotor 120 a voltage which is slightly different from the voltage value which has just previously been supplied. Therefore, the servomotor 120 will follow the voltage curve of FIG. 4 with a slight time lag, but as previously mentioned this inertial effect is minor because of the logarithmic nature of the curve and introduces only a small and constant percentage error in the actual slit width at any given time.

In order to allow the user to know what the actual slit width is at any given time, indicating means 170 are provided. This indicator comprises a logarithmically graduated drum 172 and a stationary index 174, the drum 172 being mounted on shaft 176 so as to be connected to gear 178. This gear 178 is in mesh with gear 180 which is on the same shaft 152 as previously mentioned gear 150. By this connection the indicating drum 172 will rotate with the servomotor and therefore give an indication of the present width of the slits. Since the worm 128 and gear 130 have been chosen to have a reduction ratio of 100 to 1, the gear ratios between 122 and 150 and between 180 and 178 have been chosen at a reduction of 10 to 1 each so that the indicator drum 172 is also driven at one hundredth (1/100) the angular velocity of that of the servomotor shaft 121. By this means the linear potentiometer 154 is driven at one tenth (1/10) the velocity of the servomotor, thereby allowing the servomotor to make 100 turns when a 10-turn potentiometer is utilized for the linear balancing potentiometer 154. Thus the indicating drum 172 and the logarithmic cam 134 both rotate at the same speed (namely, one hundredth as rapidly as the servomotor 120). This also allows the entire periphery of the drum 172 to be utilized as a logarithmic scale, thereby increasing its readability by the operator.

Should for any reason the operator desire to disconnect the automatic slit drive control from the slit adjusting mechanism, movement of the switch 112 to contact 190 will disconnect the sender potentiometer output and connect the output tap 192 of manually adjustable potentiometer 193 to amplifier 116; manual potentiometer 193 may be energized across the common voltage source 50 by means of wires 194 and 195. With switch 112 in this left hand position, the operator may manually rotate the adjustment means of potentiometer 193 to any value representing the logarithm of the desired slit width for the particular operation, and the voltage therefrom will be fed to amplifier 116 which will then energize servomotor 120 to turn the same gearing, cam and slit width adjusting means as previously described. This motion will continue until the linear potentiometer 154 (which, of course, is also being turned) supplied a balancing voltage to that supplied by manual potentiometer 193, at which point the servomotor will stop. Thus, movement of switch 112 from its normal right-hand position in contact with 110 to contact 190 will disconnect the automatic and substitute a manual slit adjustment means.

The graph of FIG. 4 gives the actual voltages produced by the sender potentiometer 28 over the entire wave length range desired to be tested, expressed in terms of the rotation angle ($\theta$) of the tapping means shaft 34. Let it be assumed that the resistor 52 is set to its zero value so that the voltage produced by the sender potentiometer will follow the lower curve (i.e., the one designated by the legend $x=0$). As the wave length drive moves from its starting position (corresponding to, say, tap 82 and point 202 on the lower curve of FIG. 4) toward the next point (i.e., tap 80 and FIG. 4 lower curve point 200), the voltage produced by the sender potentiometer will linearly decrease, which will therefore drive the servomotor 120 at a constant velocity in a direction to close the slits until at point 200 the slit jaws are closed so that a minimum amount of light is produced. Normally this lowest point 200 would represent not full closure of the slit jaws but rather the minimum slit width anticipated to be used with the instrument under any and all circumstances. As the wave length drive (e.g., the cam operating the Littrow mirror) continues to operate, the tapping means 32 will successively follow the resistors between the various taps of the circular interpolating potentiometer elements 31, reaching the taps themselves in a sequential manner. Thus, the straight line portions 204, 206 and 210 represent the voltage produced by the tapping means moving along a resistor such as 90 between taps while the inflection points such as 200, 208 and 212 represent the voltage at the tap points (such as 80, 81 and 82, etc.). As previously described, these varying voltages will constantly rotate servomotor 120 in the appropriate direction so that its rotational position follows the voltage curve; the linear potentiometer 154, constantly being rotated by the servomotor, causes the servomotor to rotate no farther than the appropriate ordinate value of the FIG. 4 curve. Since adjustment of the resistors 52 and 54 in the manner previously described will change the lower curve of FIG. 4 to a curve parallel thereto but somewhat above it (to the range up to and including the upper curve, labelled $x=1$, in FIG. 4), the rotational position of the servomotor corresponding to any point on the curve may be linearly shifted by these resistances. Since the slit drive cam 134 is logarithmic, a linear rotational movement of servomotor 120 will result in a movement of the slit which is not linear but rather the antilogarithm of this rotation. Because of this logarithmic function, two curves as shown in FIG. 4 (and indeed any curves which lie therebetween) will actually produce a slit width program for which any two corresponding points (i.e., 102 and 100 and, on the other hand, 202 and 200) will have the same relative ratio for all such curves. This would not be true except for the logarithmic nature of the sender potentiometer voltage and the slit drive cam 134. For example point 18 in FIG. 1 is somewhat more than four times as high as point 19 in that same figure. If the curves of FIG. 1 were raised above the $x$-axis by adding to each value of the ordinate 6,000 microns, then the new point corresponding to point 18 (now being equal to a little over 12,000) would only be somewhat less than twice the new point corresponding to point 19 (now being equal to approximately 7,500). On the other hand, with the curves of FIG. 2 or FIG. 4, a family of curves which run parallel thereto have the same relative values between corresponding points. Thus the ratio of the value of point 218 with respect to point 219 on the lower curve of FIG. 4 is the same as the ratio of the value of point 218′ with respect to point 219′ on the upper curve of FIG. 4. This is, of course, inherent in logarithmic curves, but the invention utilizes this property to allow simple overall adjustment of the slit width without introducing any relative errors in the amount of light passed thereby at various parts of the cycle of operation. Therefore, the simple expedient of two linked resistors, such as 52 and 54, as the adjustment means is made possible by the use of a logarithmic sender potentiometer and logarithmic cam, which would not be possible in the absence of this inventive use of logarithmic means The invention thus accomplishes a number of important desired results from seemingly simple expedients. As previously stated, these results include lower inertial loads, constant small error due to time lag or backlash, the ability to adjust the slit width over a large dynamic range without the use of extreme potentiometer voltage or large servomotors, and the added advantage of simple adjustment of the range of slit width for various uses of the instrument without introducing any errors in the relative size of the slit at corresponding points in the spectrophotometric tests over the entire wave length range utilized. A spectrophotometer conforming to the disclosed device has a sufficiently rapid slit adjustment ability to allow determination of the absorption curve over the entire wave length range desired (i.e., from zero to 360° rotation of the sender potentiometer shaft) in about 12 minutes and additionally has only a small percentage error even for small slit widths on the order of 10 to 100 microns.

Although a specific embodiment of the inventive device has been described as required by the patent laws, it will be obvious to one skilled in the art that many modifications may be made therein, and therefore the invention is not limited by any specific aspects of the disclosure but rather is defined solely in the appended claims.

We claim:

1. A device for regulating the slit width of spectrophotometers and similar instruments, comprising a logarithmic sender potentiometer connected to the wave length drive of said instrument and adjusted thereby, a source of voltage, said sender potentiometer being connected to said source of voltage and having an output tap for producing at said output tap a voltage equal to the logarithm of the slit width desired; a linear voltage responsive means electrically connected to said output tap so as to be driven thereby in linear relation to said voltage; logarithmic transmission means connected to and linearly driven by said voltage responsive means, said transmission means having an output equal to the antilogarithm of its input; and slit adjusting means connected to the output of said logarithmic transmission means, so that said slits are adjusted in antilogarithmic relation to said voltage responsive means.

2. A device according to claim 1 in which said voltage responsive means comprises a servomotor.

3. A device according to claim 1 in which said voltage responsive means comprises a servomotor and a balancing feedback potentiometer, said feedback potentiometer being connected to said voltage source, the control means of said balancing potentiometer being mechanically coupled to and driven by said servomotor so as to vary the output voltage of said balancing potentiometer; means for supplying said output voltage to the electrical input of said servomotor in opposing relation to the voltage from said sender potentiometer so that said servomotor is driven only by the difference between the sender potentiometer voltage and the balancing potentiometer voltage, which difference represents the difference between the logarithms of the desired and present slit widths, respectively.

4. A device according to claim 1, in which said logarithmic transmission means comprises a logarithmic cam.

5. A device for regulating the slit width of a spectrophotometer, comprising a logarithmic sender potentiometer, the adjustment means of which is operatively connected in linear relationship to the wave length drive of said spectrophotometer, a source of voltage, said sender potentiometer being connected to said source and having an output tap and for producing at said output tap a voltage equal to the logarithm of the slit width desired at the various positions of the wave length drive introduced at its adjustment means; a linear voltage responsive means electrically connected to said output tap so as to be driven thereby in linear relation to said voltage at said tap; logarithmic transmission means connected to and linearly driven by said voltage responsive means, said logarithmic transmission means having an output equal to the antilogarithm of its input; and slit adjusting means connected to the output of said logarithmic transmission means, so that said slits are adjusted in antilogarithmic relation to said voltage responsive means.

6. A device according to claim 5 in which said voltage responsive means comprises a servomotor.

7. A device according to claim 5 in which said voltage responsive means comprises a servomotor and a balancing feedback potentiometer, said feedback potentiometer being connected to said voltage source, the control means of said balancing potentiometer being mechanically coupled to and driven by said servomotor so as to vary the output voltage of said balancing potentiometer; means for supplying said output voltage to the electrical input of said servomotor in opposing relation to the voltage from said sender potentiometer so that said servomotor is driven only by the difference between the sender potentiometer voltage and the balancing potentiometer voltage, which difference represents the difference between the logarithms of the desired and present slit widths, respectively.

8. A device according to claim 5, in which said logarithmic transmission means comprises a logarithmic cam.

9. A device for regulating the slit width of spectrophotometers and similar instruments, comprising a logarithmic sender potentiometer connected to the wave length drive of said instrument for adjustment thereby and having input means adapted to be attached to a source of voltage, said sender potentiometer having an output tap and being of such construction as to produce at said output tap a voltage equal to the logarithm of the slit width desired; variable resistance means connected in series with said input of said sender potentiometer so as to be capable of varying the voltage across said input; a linear voltage responsive means electrically connected to said output tap so as to be driven thereby in a linear relation to said voltage at said tap; logarithmic transmission means connected to and linearly driven by said voltage responsive means, said transmission means having an output equal to the antilogarithm of its input; and slit adjusting means connected to the output of said logarithmic transmission means, so that said slits are adjusted in antilogarithmic relation to said voltage responsive means.

10. A device according to claim 9, in which said input means of said sender potentiometer comprises two input leads, one on each side of said sender potentiometer; and in which said variable resistance means comprises two variable resistors; one of said variable resistors being connected in series with one of said input leads, and the other of said variable resistors being connected in series with the other of said input leads, so that each of said variable resistors is between one side of the input of the sender potentiometer and the source of voltage.

11. A device according to claim 10, in which said variable resistors have similar adjusting means and substantially overlapping resistance ranges; and linking means interconnecting both of said adjusting means in such manner that movement of either adjusting means to decrease the effective value of one of said resistors increases the effective value of the other of said resistors in the same amount, so that the total combined resistance of said two resistors remains constant, thereby causing the voltage value seen by the input of said sender potentiometer to remain the same at all positions of said adjusting means of said variable resistors so that the various sender potentiometer output taps are maintained at the same voltage difference relative to each other since all are changed by the same voltage value upon movement of the adjustment means of said variable resistors.

12. A device for regulating the slit width of a spectrophotometer, comprising a logarithmic sender potentiometer, the adjustment means of which is operatively connected in linear relationship to the wave length drive of said spectrophotometer, a source of voltage, said sender potentiometer being connected to said source of voltage and having an output tap for producing at said output tap a voltage equal to the logarithm of the slit width desired at the various positions of the wave length drive introduced at its adjustment means; an output lead connected to said output tap and terminating at a first contact of a double-throw switch; a manual potentiometer connected to said voltage source and having a manually adjustable output tap for producing at said output tap a voltage equal to the logarithm of a particular desired slit width; a manual potentiometer output lead connected to said manually adjustable output tap and terminating at a second contact of said double-throw switch; a switching member in said double-throw switch, connected as a switch output and being movable to connect either of said contacts to said switch output; a linear voltage responsive means electrically connected to said switch output so as to be driven thereby in a linear relation to said voltage; logarithmic transmission means connected to and linearly driven by said voltage responsive means, said logarithmic transmission means having an output equal to the antilogarithm of its input; and slit adjusting means connected to the output of said logarithmic transmission means, so that said slits are adjusted in antilogarithmic relation to said voltage responsive means, either by said wave length drive coupled sender potentiometer or said manual potentiometer depending on the position of said switching member.

References Cited in the file of this patent
UNITED STATES PATENTS

| | | |
|---|---|---|
| 2,517,121 | Liston | Aug. 1, 1950 |
| 2,768,306 | Grubb et al. | Oct. 23, 1956 |
| 2,948,185 | Ward et al. | Aug. 9, 1960 |
| 2,960,910 | Pelavin | Nov. 22, 1960 |